US008642151B2

(12) United States Patent  (10) Patent No.: US 8,642,151 B2
Goering et al.  (45) Date of Patent: Feb. 4, 2014

(54) PREFORM AND METHOD FOR REINFORCING WOVEN FIBER NODES

(75) Inventors: Jonathan Goering, York, ME (US); Keith Edward Burgess, Georgetown, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 184 days.

(21) Appl. No.: 13/011,633

(22) Filed: Jan. 21, 2011

(65) Prior Publication Data

US 2012/0189798 A1  Jul. 26, 2012

(51) Int. Cl.
 B32B 1/00 (2006.01)
 B29C 70/24 (2006.01)
(52) U.S. Cl.
 USPC ............................ 428/57; 428/120; 442/205
(58) Field of Classification Search
 USPC ............................ 428/57, 119, 120; 442/205
 See application file for complete search history.

(56) References Cited

U.S. PATENT DOCUMENTS

| | | | |
|---|---|---|---|
| 4,913,861 A | 4/1990 | Mishima et al. |
| 4,923,724 A | 5/1990 | Day et al. |
| 5,026,595 A | 6/1991 | Crawford, Jr. et al. |
| 5,034,172 A | 7/1991 | Vives et al. |
| 5,277,854 A | 1/1994 | Hunt |
| 5,304,339 A | 4/1994 | Le Comte |
| 5,508,085 A | 4/1996 | Lockshaw et al. |
| 5,624,618 A | 4/1997 | Forman et al. |
| 5,843,354 A | 12/1998 | Evans et al. |
| 5,855,984 A | 1/1999 | Newton |
| 6,103,337 A | 8/2000 | Burgess |
| 6,149,851 A | 11/2000 | Deckers et al. |
| 6,179,943 B1 | 1/2001 | Welch et al. |
| 6,245,274 B1 | 6/2001 | Huybrechts et al. |
| 6,627,142 B2 | 9/2003 | Slaughter et al. |
| 6,630,093 B1 | 10/2003 | Jones |
| 6,630,095 B2 | 10/2003 | Slaughter et al. |
| 6,666,941 B2 | 12/2003 | Nakamura |
| 6,692,673 B2 | 2/2004 | Nakamura |
| 6,712,099 B2 * | 3/2004 | Schmidt et al. ............ 139/383 R |
| 6,902,692 B2 | 6/2005 | Carper |
| 7,097,731 B2 | 8/2006 | Purefoy et al. |
| 2002/0192450 A1 | 12/2002 | Schmidt et al. |
| 2004/0045469 A1 | 3/2004 | Herhold et al. |
| 2007/0120288 A1 | 5/2007 | Ashton et al. |
| 2008/0060755 A1 | 3/2008 | Blanton et al. |
| 2009/0247034 A1 | 10/2009 | Goering et al. |

FOREIGN PATENT DOCUMENTS

WO  WO 02/16784 A  2/2002

OTHER PUBLICATIONS

International Search Report and Written Opinion issued by European Patent Office for corresponding international application PCT/US2012/022024, mailed Jun. 4, 2012.

* cited by examiner

*Primary Examiner* — Alexander Thomas
(74) *Attorney, Agent, or Firm* — Frommer Lawrence & Haug LLP; Ronald R Santucci

(57) ABSTRACT

Preforms including fiber reinforced nodes for use in fiber reinforced composite structures and methods for making fiber reinforced composite structures. Preforms with woven fabric elements extending radially from a common node include at least one reinforcing fiber interwoven between at least two elements and passing through the node. A method of assembling preform structures using the preforms to provide a structure with reinforced nodes.

1 Claim, 12 Drawing Sheets

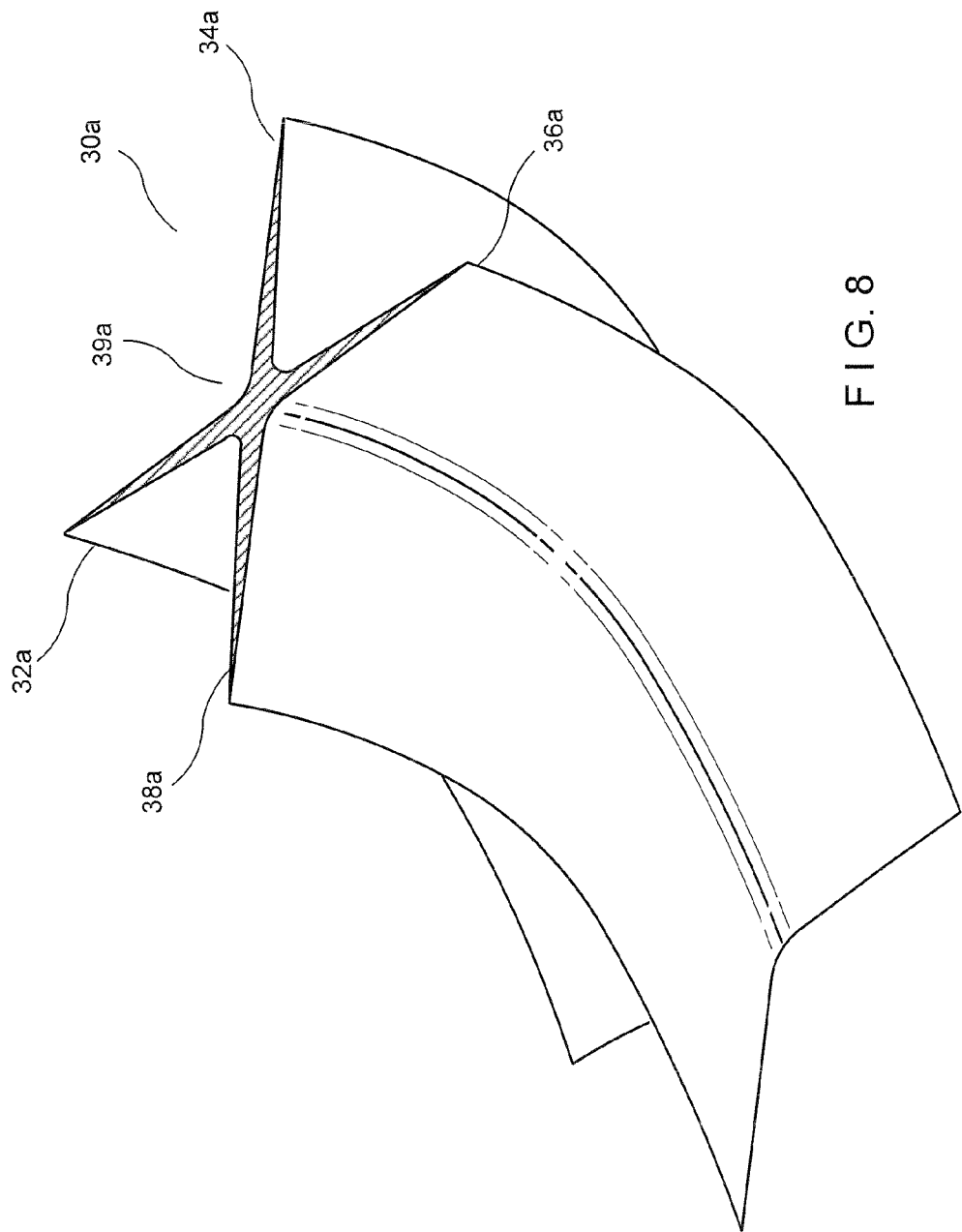
F I G. 8

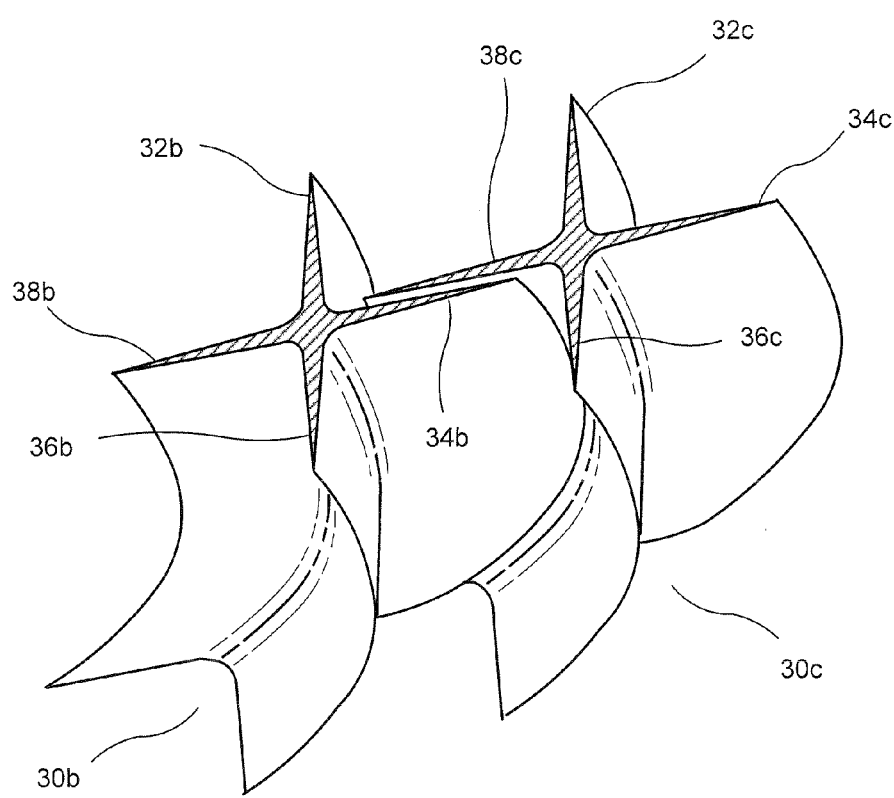
F I G. 11

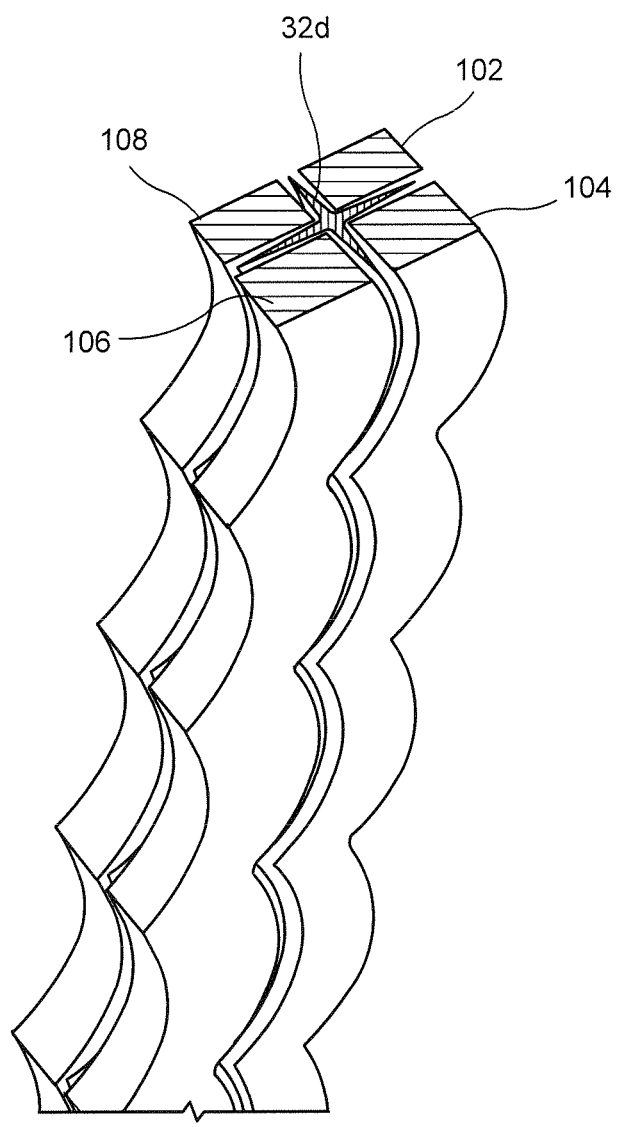
F I G. 13

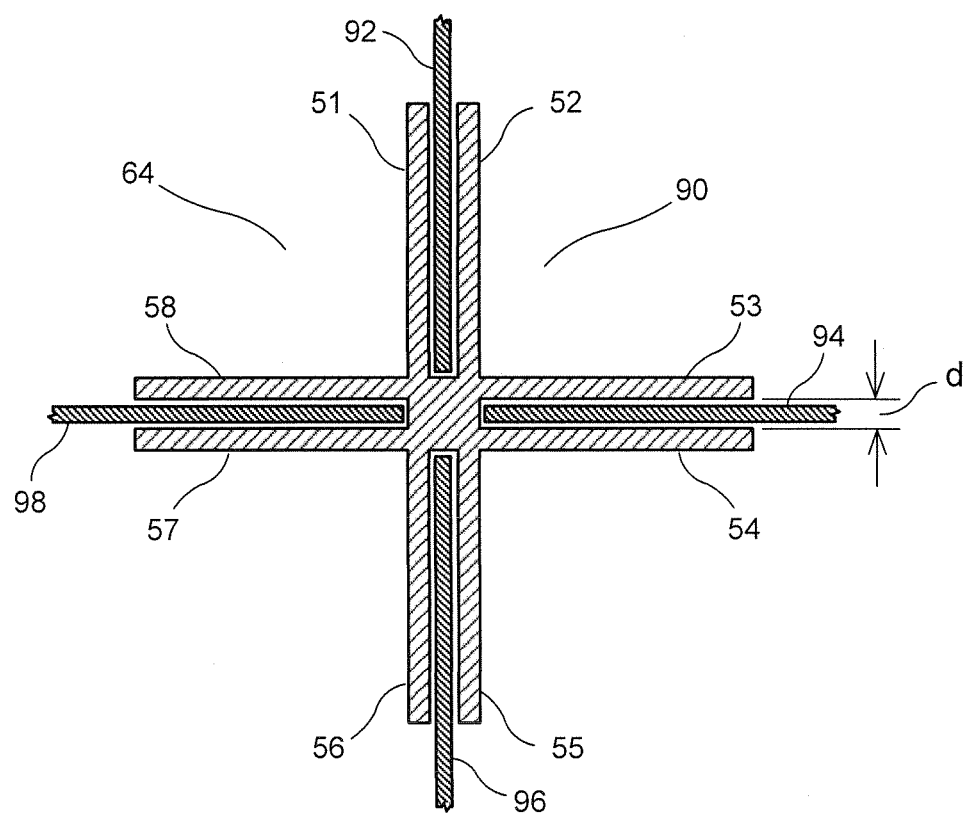
F I G. 15

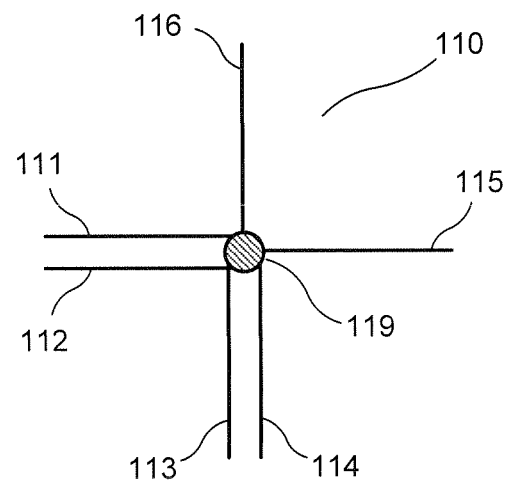
F I G. 16
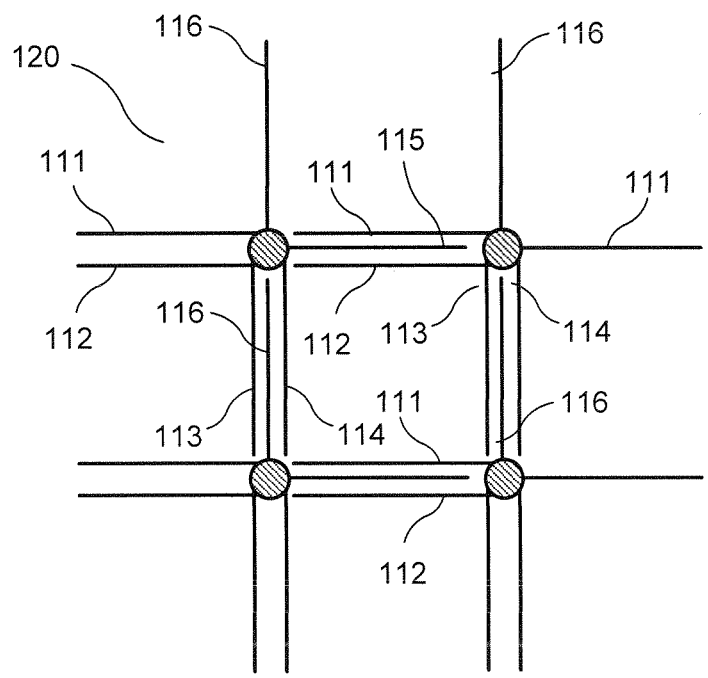
F I G. 17

PREFORM AND METHOD FOR REINFORCING WOVEN FIBER NODES

FIELD OF THE INVENTION

The present invention relates to fiber-reinforced structures. More specifically, the present invention relates to fiber reinforced preforms with planar components intersecting along an edge of at least one of the components. More specifically still, the present invention relates to a method of fabricating woven preforms having fiber reinforced nodes or joints and structures fabricated from such a method. The method may be used in the fabrication of preforms for the production of grid-like structures.

BACKGROUND OF THE INVENTION

Fiber reinforced composite structures often require two or more elements to be joined along an edge of at least one of the elements to form a joint, or node. For example, a structure may have fiber reinforced woven planar elements arranged at intersecting angles such that the elements intersect along an edge of at least one of the elements. A structure may include planar non-woven elements, for example metal sheets or plates, or ceramic panels or panels of other composition, which intersect along at least one edge.

Joining of intersecting elements may be useful in the production of grid-like structures or composite panels or skins with reinforcing ribs. In such cases, it may be desirable or necessary to provide a joint between the elements along the line of intersection. One method of achieving such a joint is to form the second element to be joined to a first element longer than necessary. The excess material of the second element is folded parallel to and placed adjacent to the first element such that a portion of the second element overlaps a portion of the first element to form a single lap joint with the overlapping portions. The overlapping portions may be fixed to each other by mechanical means, such as threaded fasteners or rivets, or chemical means, such as adhesives or resins as known in the art. Many typical applications rely upon adhesives or resins to fix the elements together.

In some cases, the second element assumes a general L-shape with one leg of the L (either the vertical or horizontal leg) parallel and adjacent to the first element. In forming a grid-like structure, a series of intersecting first and second elements can be formed as described above to form the desired grid-like structure. In some grid-like structures, first elements may be arranged in parallel rows with intersecting second elements arranged as required. Between adjacent first elements, the second elements may take on a general C-shape with approximately linear and parallel top and bottom segments, and a middle segment between, and mutually perpendicular to, the top and bottom segments. A similar result may be obtained with a second element in a general Z-shape with approximately linear top and bottom segments parallel to each other and perpendicular to a generally linear middle segment. In some cases, the middle segment may not be perpendicular to the top and bottom segments. In either form, the top and bottom segments of the second element can be fixed to adjacent first elements forming a grid-like structure.

According to known methods, the node or joint between the first and second elements is formed by a single lap shear joint parallel to the first elements. The single lap shear joint provides the structural integrity of the node with the strength of the node reliant upon the means used to join the first and second elements. Loads transferred from one element to another through the node necessarily go through the joint between the elements.

A drawback associated with nodes formed by single lap shear joints is that the strength of the joint is determined by the strength of the lap joint between the overlapping portions. Because the elements remain structurally separate, stresses applied to, or transferred to, the intersections are typically carried by the adhesive alone. The strength of the joint therefore depends on the strength of the adhesive, which in most cases is less than the strength of the fiber-reinforced elements. The difference in strength may be significant. Joints relying on adhesive alone are often the weak point in the structure.

In addition to poor strength at the nodes, present methods for fabricating a grid-like structure require significant manual labor in placing individual pieces of woven fabric in a mold, and wrapping portions of the mold with the fabric to form the open cell portion of the grid.

The present invention addresses the shortcomings of the prior art by providing a preform comprising a reinforced node and a method of fabricating a composite structure with a reinforced joint or node between elements using the claimed preform. The invention also provides a method of fabricating grid-like structures with reinforced nodes that is both less labor intensive and costly than prior methods.

Citation or identification of any document in this application is not an admission that such a document is available as prior art to the present invention.

SUMMARY OF THE INVENTION

According to aspects of this invention, a woven preform is presented comprising multiple legs interwoven through a common line of intersection, the line of intersection forming a reinforced node or joint. (For purposes of this description, "node" and "joint" are used interchangeably unless the context indicates otherwise.) The legs may be commonly woven and arranged substantially radially around, and directed outwardly from, the node. The preform may include a dry fiber preform that is united with other dry preforms and converted into a composite structure using known techniques, such as resin transfer molding. The preform may also include pre-impregnated fabric that may be united with another fabric or fabrics and cured to form a composite structure. The preform may also include a cured composite element that can be bonded to other composite elements to form a composite structure.

According to embodiments of this invention, a reinforced node including one or more fibers interwoven between two or more legs and woven through the node or joint is formed. The preforms may be useful in fabricating, among other things, grid-like structures which could, for example, be used as thrust reverser vanes, or cascades, as may be found in gas turbines used in the aerospace industry. The preforms may also be useful in fabricating reinforced composite panels or skins. Other applications would be obvious to one of ordinary skill in the art.

According to an exemplary embodiment of the invention, a woven preform comprising a plurality of legs interwoven through a common line of intersection forming a reinforced joint or node is provided. Woven preforms according to this non-limiting example may be joined with other similar preforms to form a grid-like structure with reinforced joints or nodes. By placing a portion of one or more legs from a first preform parallel and adjacent to, and in abutting contact with, a portion of one or more legs from a second similar preform, and repeating the pattern, a grid-like structure may be formed with reinforcing fibers running through the node and legs from adjacent preforms joined together.

According to some embodiments, at least one of the legs may be of uniform thickness along its length taken from the common node to the free end of each leg. In other embodiments, at least one side of at least one leg may be tapered along its length from the common node to the free end or tip of the leg. In still other embodiments, both sides of at least one leg may be tapered along the length of the leg from the common node to the free end or tip of the leg.

In a non-limiting example, a conventional loom may be used to produce a first elongate preform having four commonly woven elements or legs arranged in a cruciform shape when viewed perpendicular to the length (i.e., along the longitudinal axis). A second similarly sized and shaped preform may be produced separately or cut from the first preform. The two preforms may be arranged with the longitudinal axes generally parallel and oriented such that one leg or element of the first preform is parallel to a leg or element of the second preform and the parallel elements are at least partially overlapping and abutting. In such an arrangement, the two cruciform preforms are configured such that four elements are parallel and generally coplanar. These may be represented, for example, as the horizontal elements of the two cruciform preforms.

The other two elements of each preform are perpendicular to the coplanar elements, parallel to each other and spaced apart. In this example, these would be represented by four vertical elements.

Together, the two cruciform preforms comprise a composite structure first subassembly.

A second subassembly, similarly sized, shaped, and configured, can be positioned such that two of the vertical elements of the second subassembly at least partially overlap and abut two vertical elements of the first subassembly. Thus placed together, four cruciform preforms form one complete (center) cell of a 3×3 grid. In this example, the grid may resemble a tic-tac-toe grid. The perimeter grid cells are incompletely closed, with the corner cells having two sides in place and the four internal cells having three sides in place. From this basic configuration, additional cruciform preforms can be added to enclose at least some of the partially formed cells to increase the size of the grid as desired.

The preform grid can subsequently be processed into a composite structure through known methods depending upon the composition of the preform. For example, if the preform is comprised of dry fibers, a process such as resin transfer molding may be used to introduce a resin to the preform and cured to form a composite structure. A preform comprised of pre-impregnated components may be co-cured under appropriate conditions to bond the preforms to form a composite structure. A grid assembled from fully cured composite components may be formed into a composite structure by providing an appropriate bonding material to the overlapping portions of the elements and curing the bonding material. Other known methods of composite structure construction may be used depending on the preform composition, requirements of the composite structure, or other concerns.

According to other non-limiting examples, a first elongate preform having fewer than four elements, for example three elements, or more than four elements, for example five elements may be formed. In some instances, a conventional loom may be used to produce the woven fabric for the preforms. In some embodiments, the preforms, when viewed in a cross section perpendicular to the length, would have a common, centrally located node from which each of the elements extends radially.

Preforms may be linear in the length dimension or may be curvilinear. Linear preforms would yield a linear node, while a curvilinear preform would yield a node with a curvature in one or more directions when viewed along the intersection. Either shape preform can be assembled to form a grid-like structure using similar processes.

Another exemplary embodiment of the present invention is directed to a reinforced preform comprising interwoven legs arranged in pairs of adjacent legs having a common line of intersection and commonly woven reinforcement, forming a reinforced node. The multiple leg pairs may be woven such that reinforcing fibers are woven between the individual legs in a pair as well as between one or more additional legs or leg pairs. The node is formed between the interwoven leg pairs at the common line of intersection and includes reinforcing fibers interwoven between the legs.

The leg pairs may be substantially planar and parallel, spaced apart from each other forming a void, and configured to accept a planar element in the void formed between the legs. For purposes of this disclosure, an "element" can be a woven fabric or woven fabric structure that is combined with other woven fabric components, elements, or preforms, through known processes, to form a composite structure, or non-woven structures such as metallic sheets or plates, or panels, such as ceramic panels, or panels of other material. If woven, "elements" may be dry fiber fabrics or preforms, pre-impregnated fabrics or preforms, cured composite elements, or of other known compositions depending on the particular use and stage in the manufacturing process.

For example, a preform having six legs arranged in three pairs of adjacent legs may accept three planar elements, one between each pair of legs. In this non-limiting example, the preform provides the three planar elements intersecting at a joint, or node, with fiber reinforcement through the node. Similarly, eight legs arranged in four pairs of legs could accept four elements. The leg pairs may be spaced equidistant around the node or may be unevenly spaced as required.

In a similar fashion, the leg pairs may be substantially non-planar with locally parallel facing surfaces, spaced apart from each other forming a void, and configured to accept a similarly shaped non-planar element in the void formed between the legs. At least the inner facing surfaces of the two legs in a pair have generally matching, but opposite, contours. That is, if the inner facing surface of a first leg is concave at a particular point, a corresponding location on the inner facing surface of the second leg would have a curvature similar in degree but opposite in sense, meaning convex at that point. Thus, parallelism, or near parallelism, between inner facing surfaces of the legs in a pair is substantially maintained at all points.

For a non-limiting example, in a woven fabric element having two parallel major surfaces (as opposed to edge surfaces), the major surfaces may have a simple, varying, or complex curvature, where the curvature of one side of the fabric is the inverse of the other side, maintaining localized parallelism of element faces. That is, if one surface has a concave curvature at a particular location, the corresponding location on the opposite side of the fabric necessarily has a convex curvature. The element may have constantly changing curvatures over the surface of the fabric.

A leg pair configured to receive a portion of a non-planar element would have a contour and configuration substantially the same as the portion of the element to be received. When such curvilinear preforms are assembled, the legs in the preform structure would have curved lines of intersection, with curvature in one or more directions.

Regardless of the planarity of the elements and leg pairs, a preform structure comprising one or more preform leg pairs and one or more elements can be processed into a composite structure using methods similar to those discussed above. The leg pairs and associated elements may be cured, co-cured, or bonded to produce a composite structure. The interface between the preform and element may comprise a single or double lap shear joint.

According to embodiments of the inventive method, a process is disclosed in which grid-like structures can be fabricated with reinforced nodes in a more economical process than previously known. The method is suitable for use with shaped preforms as discussed above, that is, the preforms may have a cruciform shape when viewed along their length, and the length may be linear or curvilinear. The process may include a mold or form (typically referred to as a "tool" or "tooling") shaped and configured to correspond with the desired shape of the finished product.

Preforms according to the invention may be fabricated from fibers that have a coating capable of being cured. Alternately, a suitable coating may be added to the preform prior to fabrication of the grid-like structure. Non-limiting examples of preforms capable of being cured include preforms woven from fibers coated with sizing or tackifiers prior to weaving, tackifiers applied to the preform after weaving, and preforms pre-impregnated with a resin material.

Preforms may be used as inserts in an appropriately sized and shaped mold. The inserts to be used may be cut to near net shape prior to insertion in the mold, or they may be trimmed while in the mold. In the mold, the inserts may be placed in appropriately shaped cavities provided within the tool or mold with portions of adjacent preforms overlapping and abutting each other.

Additional materials may also be placed within the mold as required. The mold, preforms, and any additional inserted material may be pre-heated in the mold. A resin or matrix material may be injected under appropriate conditions, including pressure and temperature, to solidify the grid-like structure. After proper processing, the grid-like structure may be removed from the mold and trimmed to final size as necessary.

According to embodiments of this invention, a reinforced preform is provided comprising a plurality of commonly woven fabric elements edgewise joined and radially extending from a common node wherein at least one reinforcing fiber from each of the plurality of elements is woven through the node and into at least one other of the plurality of elements. In some embodiments, at least one of the fabric elements comprises generally parallel major surfaces. In other embodiments, at least one of the major surfaces tapers from the node to the end of the element. In some embodiments, the fabric elements are arranged in pairs of adjacent elements such that opposite facing adjacent major surfaces of the elements are spaced apart a distance and form a void therebetween.

In some embodiments of the invention, a composite structure, or generally a structure, is provided which comprises a plurality of preforms each of which comprises a plurality of commonly woven fabric elements edgewise joined and radially extending from a common node with at least one reinforcing fiber from each of the plurality of elements woven through the node and into at least one other of the plurality of elements. Each of the plurality of preforms includes a longitudinal axis, and the preforms are arranged such that the axes are aligned generally parallel in a grid-like pattern. A first end of a woven fabric element overlaps and abuts at least a first woven fabric element.

In embodiments of the structure, provided are elements which comprise major surfaces wherein at least a first of the plurality of preforms comprises adjacent elements arranged in pairs such that opposite facing adjacent major surfaces are spaced apart a distance and form a void therebetween. An element is provided which is at least partially received within the void, overlapping and abutting at least a portion of one of the opposite facing adjacent major surfaces thereof. In some embodiments, a second preform of the plurality of preforms comprises adjacent elements arranged in pairs such that opposite facing adjacent major surfaces are spaced apart a distance and form a void therebetween. A second end of the element is at least partially received within the void formed in the second preform, overlapping and abutting at least one of the opposite facing adjacent major surfaces thereof.

Embodiments of a method of forming a reinforced composite structure include fabricating a first reinforced preform comprising a plurality of commonly woven fabric elements edgewise joined and radially extending from a common node wherein at least one reinforcing fiber from each of the plurality of elements is woven through the node and into at least one other of the plurality of elements; fabricating a second reinforced preform like the first comprising at least one element; positioning at least a portion of the element adjacent to at least a portion of the first woven preform to form a preform assembly; processing the preform assembly to form a composite structure.

In some embodiments of the inventive method, the fabric elements of the first woven preform comprise major surfaces. In other embodiments, the second reinforced preform further comprises a plurality of commonly woven fabric elements, comprising major surfaces, edgewise joined and radially extending from a common node wherein at least one reinforcing fiber from each of the plurality of elements is woven through the node and into at least one other of the plurality of elements. In embodiments, the first and second reinforced preforms have longitudinal axes and are arranged with their longitudinal axes generally parallel. The first and second preforms are assembled such that a portion of at least one of the major surfaces of the first woven preform at least partially overlaps and abuts a portion of at least one of the major surfaces of the second woven preform.

Some embodiments of the method include arranging at least some of the fabric elements of a first preform in pairs of adjacent elements such that opposite facing adjacent major surfaces are spaced apart a distance and form a void therebetween; and positioning at least a portion of the first end of the element of a second preform within one of the voids formed in the first reinforced preform, overlapping and abutting at least a portion of one of the opposite facing adjacent major surfaces thereof.

Other embodiments include arranging at least some of the fabric elements in pairs of adjacent elements such that opposite facing adjacent major surfaces are spaced apart a distance and form a void therebetween; positioning a first end of a woven element such that it is at least partially received within the void formed in the first reinforced preform; and positioning a second end of the element such that it is at least partially received in one of the voids formed in the second reinforced preform, overlapping and abutting at least a portion of one of the opposite facing adjacent major surfaces thereof.

It is noted that in this disclosure and particularly in the claims, terms such as "comprises," "comprised," "comprising" and the like can have the meaning attributed to it in U.S. Patent law; e.g., they can mean "includes," "included," "including" and the like.

These and other embodiments are disclosed or are apparent from and encompassed by the following Detailed Description.

BRIEF DESCRIPTION OF THE DRAWINGS

The following detailed description, given by way of example and not intended to limit the invention to the disclosed details, is made in conjunction with the accompanying drawings, in which like references denote like or similar elements and parts, and in which:

FIG. 8 is a perspective view of a woven reinforced preform according to an embodiment of the invention;

FIG. 11 is a plan view of a reinforced preform structure according to an embodiment of the invention;

FIG. 13 is a perspective view of mold elements retaining and shaping a reinforced woven preform prior to formation of a composite structure;

FIG. 15 is a reinforced structure according to an embodiment of the invention;

FIG. 16 is an axial view of a reinforced woven preform according to an embodiment of the invention; and FIG. 17 is a plan view of a reinforced woven preform structure comprising the woven reinforced preform of FIG. 16.

DETAILED DESCRIPTION

Embodiments of the invention are described below with reference to the accompanying drawings which depict embodiments of woven reinforcing preforms and composite structures produced therefrom. However, it is to be understood that application of the invention encompasses other reinforcing preforms and is not limited to those illustrated. Also, the invention is not limited to the depicted embodiments and the details thereof, which are provided for purposes of illustration and not limitation.

Figure 1:
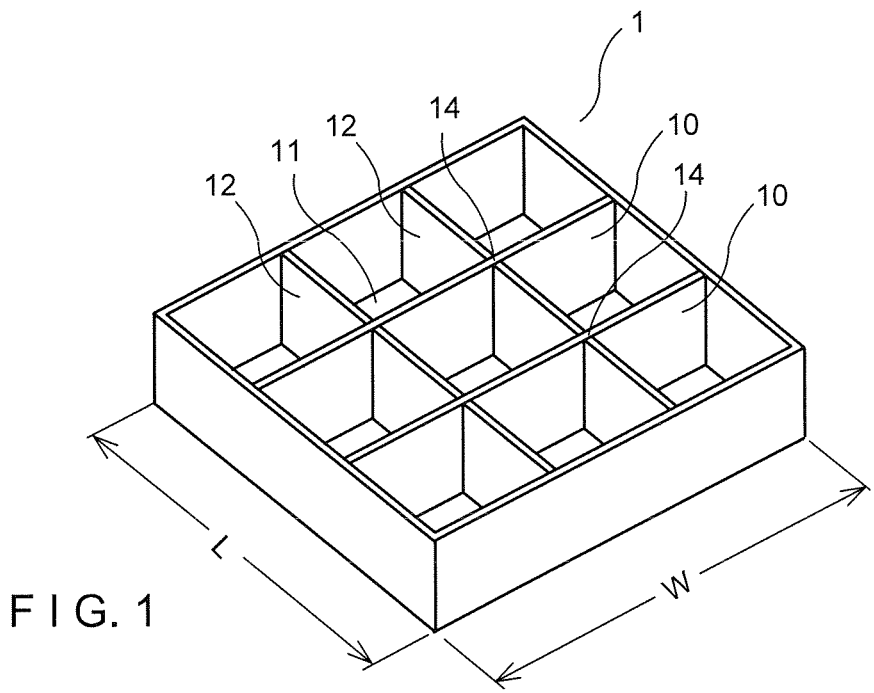
FIG. 1 is a perspective view of a grid-like structure.

Composite structures often include details that require elements to be joined along their edges. FIG. 1 illustrates an open grid-like composite structure 1 including woven first elements 10 intersecting with, and joined to, woven second elements 12. At the line of intersection 14, one of the elements, 12 for example, is interrupted along its length as it crosses an element, 10 in this example. The line of intersection 14 is often referred to as a node or joint. Between adjacent pairs of first elements 10 and adjacent second elements 12, a cell 11 is formed. As illustrated, cell 11 is substantially rectangular, but may be differently shaped depending upon intended use or other requirements.

Figure 2:
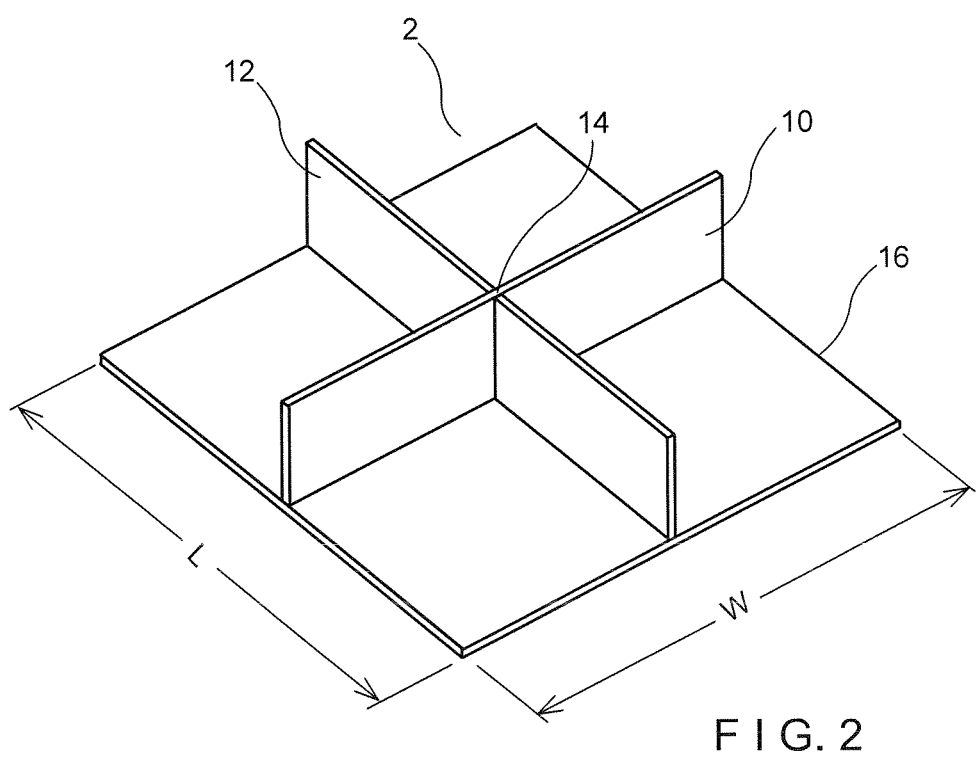
FIG. 2 is a perspective view of a reinforced panel or skin.

FIG. 2 illustrates a composite structure 2 comprising skin or panel 16 reinforced or stiffened by elements 10, 12 positioned adjacent to at least one surface of the panel 16 and arranged to intersect at node or joint 14.

Figure 3A:
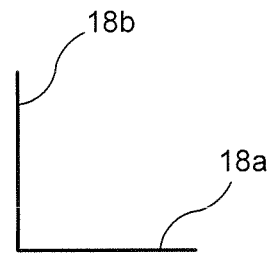
FIGS. 3a-3c are axial views of elements which may be used in the grid-like structure of FIG. 1 or the reinforced panel of FIG. 2.
Figure 3B:
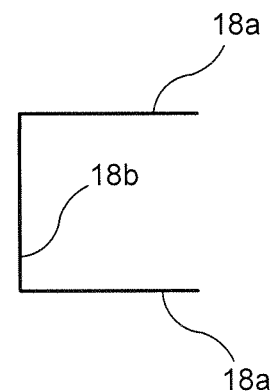
Figure 3C:
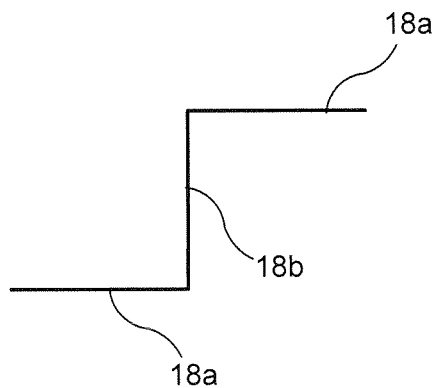

Composite structures like those illustrated in FIGS. 1 and 2 are typically fabricated from a number of woven first elements 10, for example, of sufficient length to span a dimension of the desired structure, W in this example. A number of woven second elements 12 are fabricated into geometric shapes to fit between adjacent first elements 10. The second elements 12 may be fabricated into L-, C- or Z-shapes with generally linear horizontal and vertical segments 18a and 18b, respectively, as illustrated in FIGS. 3a-3c. The generally horizontal segments 18a are typically fixed to a portion of the first element, or elements, 10. Nodes or joints 14 are formed at the line of intersection of elements 10, 12. Elements 10, 12 are processed into composite assemblies using known processes.

Because elements 10, 12 are structurally separate elements, no fibers common to both elements span the node 14. Structurally, the node 14 often becomes the weak point in the structure. Loads applied to the composite structure 1, 2 or to a element 10, 12 may be transferred along an element to a node 14. The load-carrying capacity of the node is typically dependent upon the bonding method employed, and usually limited by the adhesive system used in the bonding method. Loads in excess of the load-carrying ability of the node can cause failure of the structure 1, 2, at the node, often resulting in catastrophic failure.

It is often desirable to provide a node between intersecting elements 10, 12 that is capable of transferring greater loads than known node construction techniques. The instant invention provides a node that includes at least one fiber running therethrough. The fiber or fibers running through the node increase the load carrying capacity of the node by supplementing the load carrying strength of the attachment between the elements.

Figure 4:
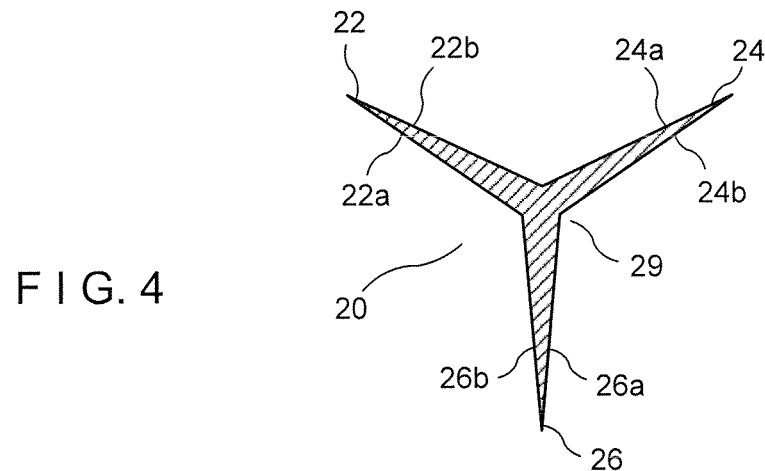
FIG. 4 is an axial view of a woven reinforced preform according to an embodiment of the invention.

According to embodiments of the invention, a woven reinforced preform 20 comprises a plurality of fabric legs 22-26 woven together as commonly edgewise joined sheets and intersecting at reinforced node 29 as illustrated in FIG. 4. As illustrated, legs 22-26 are woven together at a line of intersection forming node 29 as part of a fabric and may be woven using known techniques. Using known weaving techniques, the preform 20 can be woven to substantially any length, the length being perpendicular to the view of FIG. 4.

In weaving the reinforced woven preform 20, at least one reinforcing fiber is woven between each of the legs such that each leg shares a woven reinforcing fiber with at least one other leg. For example, leg 22 may have at least one common fiber woven with leg 24. Leg 24 may have at least one common fiber with leg 26, and leg 26 may have at least one common fiber with leg 22.

As illustrated, the legs 22-26 comprise major surfaces 22a, 22b, 24a, 24b, 26a, 26b which are non-parallel and substantially uniformly tapered along the length, narrowing from the node 24 outward. In alternate embodiments, the leg surfaces may be substantially parallel, forming legs of uniform thickness along their length, or they may be tapered on one side only. The legs 22-26 are illustrated evenly spaced around node 29 for ease of illustration only. The legs may be positioned at any angular position around the node 29 as may be desirable.

Figure 5:
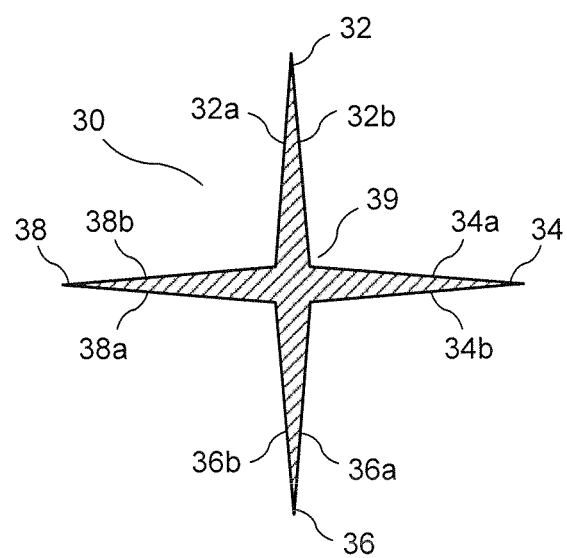
FIG. 5 is an axial view of a woven reinforced preform according to an embodiment of the invention.

Alternate embodiments may have more that 3 legs radially spaced around the node. A non-limiting, exemplary embodiment of an alternate preform is illustrated in FIG. 5 in which a reinforced woven preform 30 comprises 4 legs 32-38, edgewise joined and spaced radially around node 39. The legs 32-38 may comprise major surfaces 32a, 32b, 34a, 34b, 36a, 36b, 38a, and 38b. The legs may be tapered on one or both sides as illustrated in FIG. 5, or may be uniform in thickness along their length as described above.

Embodiments of the present reinforced woven preform may comprise legs similar to those described above, arranged in pairs positioned radially around the node. Individual legs in a pair may differ from each other, for example, they may be of different dimensions such as thickness T, length in the direction of the node, or width W radially from the node 49, as shown in FIG. 6.

Figure 6:
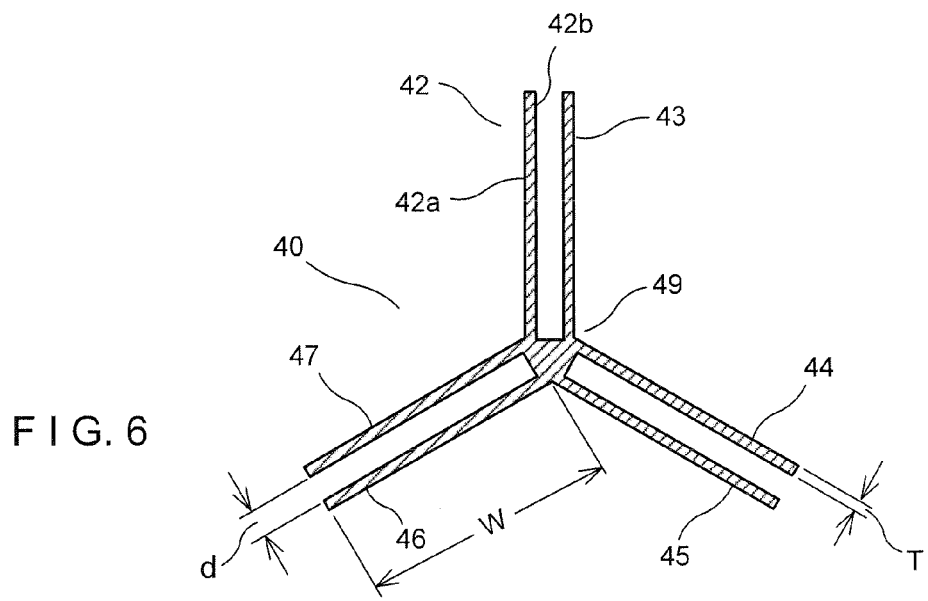
FIG. 6 is an axial view of a woven reinforced preform according to an embodiment of the invention.

As a non-limiting example of a preform with leg pairs, FIG. 6 illustrates a preform 40 comprising 6 legs 42, 43, 44, 45, 46, 47 arranged as 3 pairs of legs edgewise joined and radially arranged around node 49. Each pair of legs comprises 2 adjacent legs arranged substantially parallel to each other and spaced apart a distance d forming a void. When weaving between leg pairs (42,43), (44,45), (46,47), the reinforcing fiber may weave between adjacent legs, that is a fiber may weave from leg 43 to leg 44, for example. Alternately, a reinforcing fiber may weave from one leg, bypass one or more legs, and weave into a subsequent leg. Reinforcing fibers may be woven from one leg in a pair to another leg in another pair. For example, a reinforcing fiber may weave between a leg in a pair, for example, leg 42 (or 43), may weave with leg 45 (or 46), thus skipping adjacent leg 44. When woven between legs, the reinforcing fiber passes through the node 49.

Figure 7:
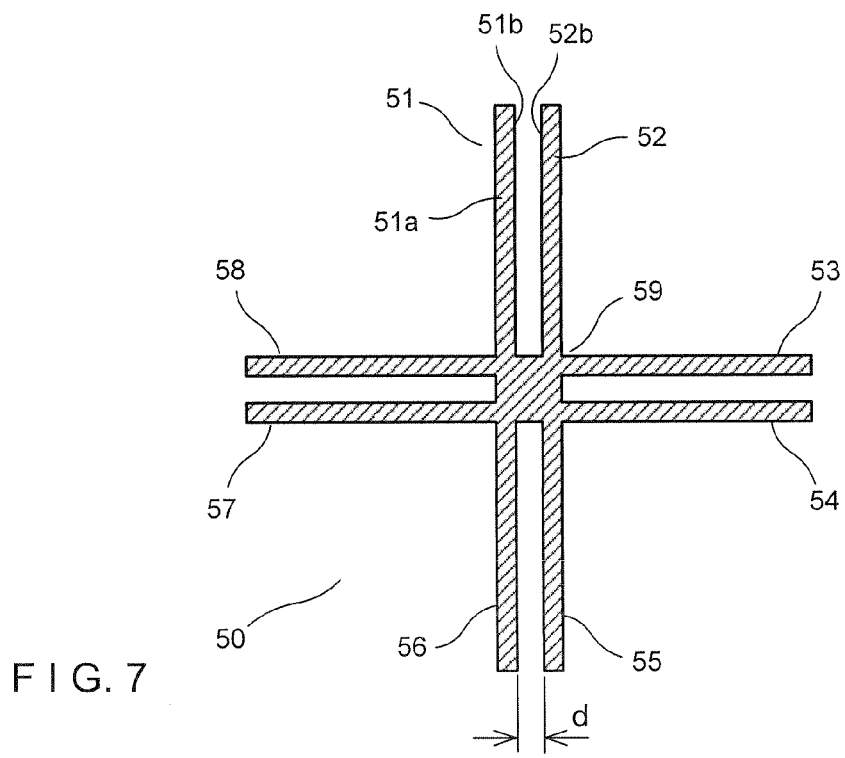
FIG. 7 is an axial view of a woven reinforced preform according to an embodiment of the invention.

A similar embodiment is illustrated in FIG. 7 in which a reinforced preform 50 comprises 8 edgewise joined legs, comprising 4 pairs of legs spaced apart by a distance d forming a void between the legs, the pairs of legs arranged radially around the node 59. As above, a fiber may weave from one leg in a pair and weave into a leg in another pair, with the reinforcing fiber passing through the node 59.

Leg pairs (42,43), (44,45), (46,47) are illustrated in FIGS. 6 and 7 as spaced apart a distance d, forming a void or space between the oppositely facing adjacent major leg surfaces. For ease of illustration only, the space as illustrated comprises a flat bottom joined to the leg faces at right angles. It is anticipated that the bottom of the space formed between the legs of a pair will not be flat, nor will the bottom and sides join at a sharp angle. In keeping with typical composite practice, it is anticipated that most inside and outside corners will not be sharp or square but will be rounded. Corners in the illustrations are drawn sharp for ease of illustration only.

Exemplary leg major surfaces 42a, 42b (FIG. 6) and 51a, 51b (FIG. 7) are illustrated as flat and substantially parallel for ease of illustration only. In the embodiments shown, legs 42-47 (FIG. 6) and 51-58 (FIG. 7) are substantially uniform in thickness. As in other embodiments of the invention, the legs of embodiments illustrated in FIGS. 6 and 7 may comprise non-parallel surfaces and therefore legs which are tapered along their length.

Preforms may have a linear node along the length of the preform. That is, the node may form a straight, or substantially straight, line for the length of the preform. For example, preforms 20, 30, 40 and 50, shown in end view in FIGS. 4-7, may extend perpendicular to the plane of the page for the length of the preform, yielding a linear preform.

Alternately, preforms according to this disclosure may have a portion, or portions, with a curvilinear configuration, or may be entirely curvilinear over their length. That is, the preform may be formed in, or may assume, a desired curvilinear configuration, as illustrated by preform 30a in FIG. 8. In cross section, the preform 30a is similar to preform 30 shown in FIG. 5, with 4 elements 32a-38a edgewise joined and spaced radially around node 39a. A difference is that elements 32a-38a in FIG. 8 may be woven to accommodate a degree of in-plane or out-of-plane curvature. As illustrated, elements 34a and 38a are substantially co-planar and are curved within that plane. Elements 32a and 36a are substantially co-linear and lie on substantially the same curved surface, with the elements demonstrating an out-of-plane curvature along the length of the preform.

Figure 9:
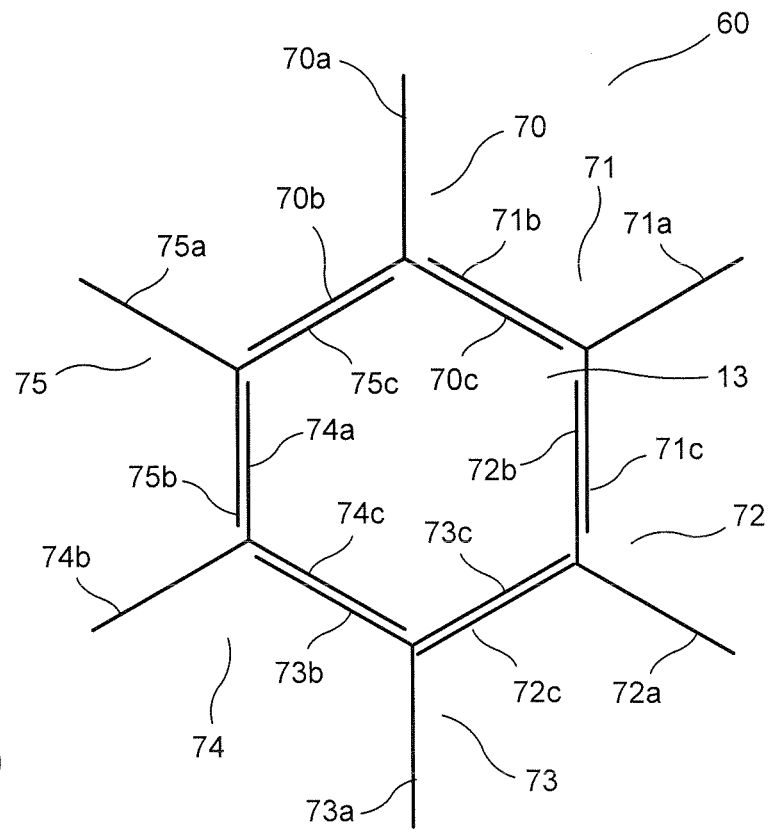
FIG. 9 is a plan view of a reinforced woven preform structure according to an embodiment of the invention.

Reinforced preforms according to embodiments of this invention may be assembled in a variety of ways to form grid-like structures comprising reinforced nodes. In some embodiments, the reinforced preforms may be assembled to provide reinforced nodes in composite structures, for example at the intersection of elements. FIG. 9 illustrates a non-limiting example of a reinforced woven preform structure 60 according to an embodiment of the invention in which a number of preforms 70-75, each comprising 3 woven fabric legs, is assembled in an exemplary combination to form a grid-like composite structure. Different manners of combining similar preforms to form a similar structure would be obvious to one of ordinary skill in the art.

FIG. 9 is a plan view of a woven preform structure 60 according to the invention, with the preforms 70-75 extending perpendicular to the plane of the paper.

According to the non-limiting example of FIG. 9, a woven preform structure 60 according to the invention may be assembled from reinforced preforms 70-75, each composing three legs, or elements, as follows. A first preform 70 is arranged such that one leg 70a is oriented vertically and directed upward, a second leg 70c is oriented downward, for example to the right of the vertical leg, and the third leg of the triplet 70b is oriented downward, to the left as illustrated. A second preform 71 is arranged such that a leg 71b abuts and substantially overlaps leg 70c on the side of 70c between 70a and 70c (the "outside" of woven preform structure 60). Leg 71a extends upward and to the right from the node and leg 71c is oriented downward from the node, vertically, and generally parallel to leg 70. Preform 72 is arranged with a leg 72b oriented substantially vertically, abutting and substantially overlapping leg 71c to the side of 71c between leg 71b and 71c (the "inside" of the structure 60).

Preform 73 is arranged with leg 73a oriented vertically downward, substantially co-planar with leg 70a. Leg 73c is oriented upward to the right, abutting and substantially overlapping leg 72c, to the side of 72c forming the inside of the structure. Leg 73b is oriented upward to the left. Preform 74 is arranged similar to preform 72, offset to the left of 72. Leg 74a is oriented vertically upward, leg 74c is oriented downward to the right, abutting and substantially overlapping leg 73b to the inside of the structure. Leg 74b is oriented downward to the left. Preform 75 is arranged in a manner similar to that of preform 71, offset to the left of preform 71. Leg 75b is oriented vertically downward abutting and substantially overlapping leg 74a to the outside of the structure. Leg 75c is oriented upward toward the right abutting and substantially overlapping leg 70b. Leg 75a is oriented upward to the left.

Thus arranged, preforms 70-75 form a woven preform structure 60 comprising a substantially hexagonal cell 13. It would be obvious to one of ordinary skill in the art that the single cell 13 illustrated in FIG. 9 could be expanded into a grid-like structure by combining additional preforms, similar to 70-75, with the illustrated preform structure by overlapping and abutting preform legs in a similar manner, forming additional hexagonal cells. As discussed above, the structure may be further processed to form a composite structure using any of the known methods.

The woven fabric legs 70a-75c in FIG. 9 are shown as line segments for ease of illustration only. In such a structure, the legs of each woven preform would necessarily have a thickness. It is anticipated that woven fabric legs 70a-75c may have a varying thickness along the length of at least some of the legs. For example, the legs 70a-75c of the woven preform of FIG. 9 may have a uniformly varying leg thickness similar to that illustrated in FIG. 4. Alternately, the legs of the preforms comprising the structure 60 of FIG. 9 may also be of uniform thickness.

Overlapping legs, for example legs 70c and 71b, may form a single lap shear joint when the structure 60 is cured into a composite structure. Legs having varying thickness, when overlapped, may form a leg having a uniform, or substantially uniform, thickness along its length. As illustrated in FIG. 9, according to one embodiment of the invention, the legs 70a-75c of woven preforms 70-75 are substantially the same length such that overlapping legs may be substantially coextensive. In some embodiments, overlapping legs may not be the same length. In addition, legs 70a-75c may differ in depth, taken perpendicular to the view of FIG. 9.

Figure 10:
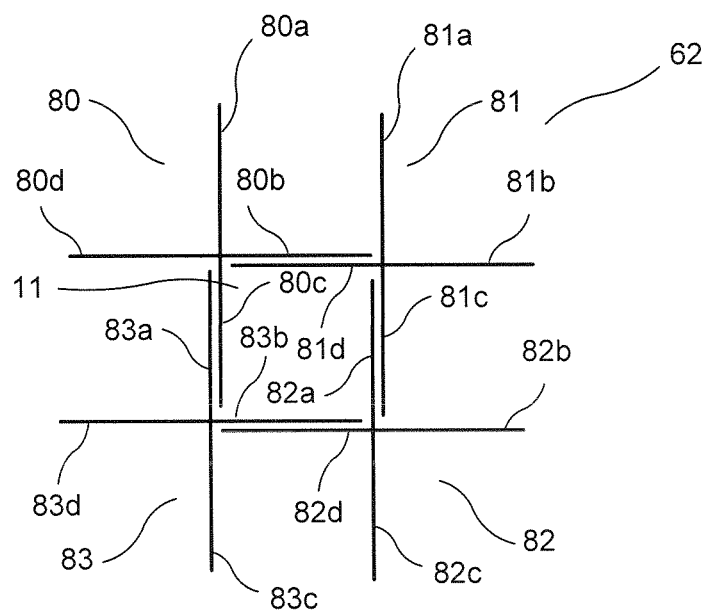
FIG. 10 is a plan view of a reinforced woven preform structure according to an embodiment of the invention.
Figure 12:
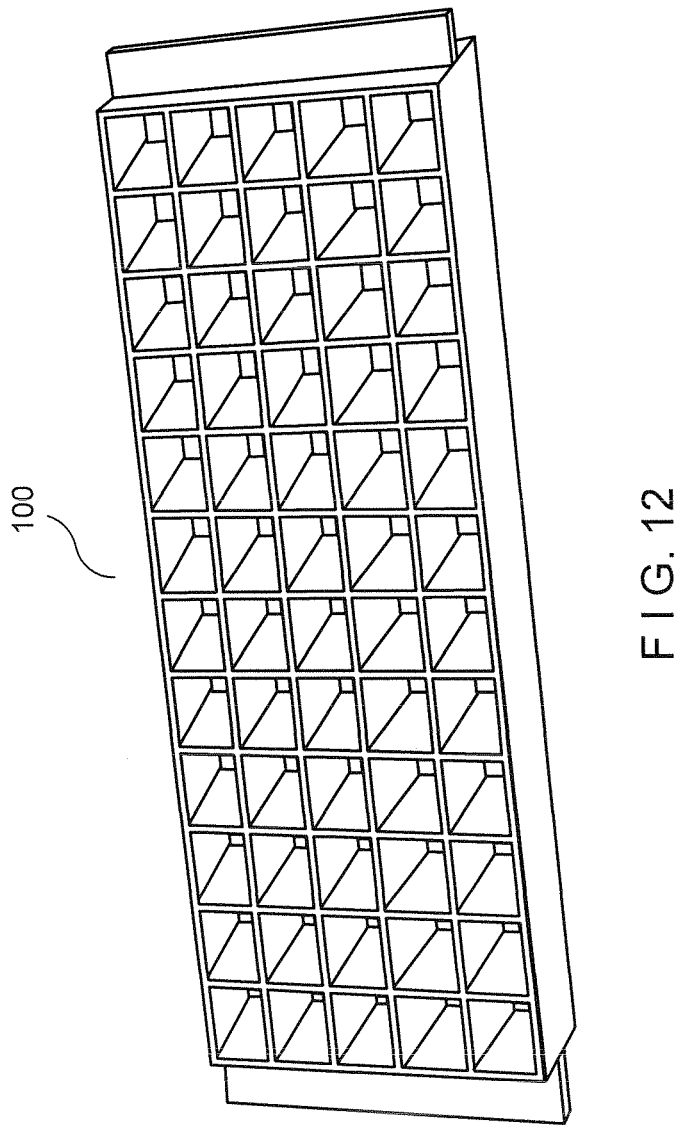
FIG. 12 is a perspective view of a grid-like structure made according to an embodiment of the invention.

In FIG. 10, reinforced preforms 80, 81, 82, and 83, may be assembled to form a woven preform structure 62 according to another embodiment of the invention. Preforms 80-83 comprise woven fabric legs 80a-83d. As with the embodiment of FIG. 9, legs 80a-83d of the preform structure 62 of FIG. 10 are illustrated using line segments for ease of illustration only. In such a structure, the legs of each woven preform would necessarily have a thickness. It is anticipated that woven fabric legs 80a-83d may have a varying thickness along the length of at least some of the legs. For example, the legs 80a-83d of the woven preform of FIG. 10 may have a uniformly varying leg thickness similar to that illustrated in FIG. 5.

According to the non-limiting example of FIG. 10, a woven preform structure 62 according to the invention may be assembled from reinforced preforms 80-83, each composing four legs, as follows. A first preform 80 is arranged with a pair of legs 80a and 80c arranged vertically and coplanar, with legs 80b and 80d coplanar with each other and perpendicular to 80a, 80c. That is, 80b and 80d are horizontally oriented, with 80b to the right of 80a, 80c. Preform 81 may be arranged such that legs 81a and 81c are coplanar and vertically oriented such that 81a, 81c are parallel to and offset to the right from 80a, 80b. Coplanar legs 81b and 81d are horizontally oriented with leg 81d abutting and substantially overlapping leg 80b to the side opposite leg 80a (the "inside" of woven preform structure 62). Preforms 83 and 82 are arranged similarly to preforms 80 and 81, respectively, with 83 and 82 located below 80, 81. Vertical legs 82a and 82c are coplanar and oriented with leg 82a abutting and substantially overlapping leg 81c to the inside of the structure. Vertical legs 83a and 83c are coplanar and oriented with leg 83a abutting and substantially overlapping leg 80c to the outside of the structure. Horizontal legs 82b and 82d are coplanar and parallel to legs 80b, 80d, 81b, 81d. Horizontal legs 83b and 83d are coplanar and parallel to legs 80b, 80d, 81b, 81d, with leg 83b abutting and substantially overlapping leg 82d toward the inside of the structure.

Overlapping legs, for example legs 80b and 81d, may form a single lap shear joint when the structure 62 is formed into a composite structure. Legs having varying thickness, when overlapped, may form a leg having a uniform, or substantially uniform, thickness along its length. As illustrated in FIG. 10, according to one embodiment of the invention, the legs 80a-83d of woven preforms 80-83 are substantially the same length such that overlapping legs may be substantially coextensive. In some embodiments, overlapping legs may not be the same length. In addition, legs 80a-83d may differ in depth, taken perpendicular to the view of FIG. 9.

Thus arranged as in FIG. 10, preforms 80-83 form a woven preform structure 62 comprising substantially rectangular cell 11. It would be obvious to one of ordinary skill in the art that the single cell 11 illustrated in FIG. 10 could be expanded into a grid-like structure by combining additional preforms, similar to 80-83, with the illustrated preform structure by overlapping and abutting preform legs in a similar manner. As discussed above, the preform structure 62 may be further processed to form a composite structure using any of the known methods.

Curvilinear preforms may be similarly assembled to form similar structures as illustrated in FIG. 10. Curvilinear preforms can be assembled, for example, as illustrated in FIG. 11, in which two preforms 30b and 30c, similar to preform 30a of FIG. 8, are assembled in an exemplary configuration prior to being formed into a composite structure. Preforms 30b and 30c have the same, or substantially the same, curvature such that elements or legs 34b and 38c overlap and remain substantially parallel and abutting over their lengths, which may or may not be coextensive. Preforms 30b and 30c may be woven such that the lengths of preform are positionable in the desired curved orientation and remain so configured without the need for positioning means prior to being formed into a composite structure.

It would be obvious to one of ordinary skill in the art to combine additional preforms, similar to 30b and 30c to form a larger grid-like structure. One non-limiting example of such a structure 100 is illustrated in FIG. 13. An exemplary use for structure 100 may include use as a thrust reverser or cascade, commonly used to direct the flow of air around an aircraft turbine engine. Other structures made in a similar fashion and/or other uses for the exemplary structure 100 would be obvious to one of skill in the art.

In other embodiments, preforms may be woven in an easily fabricated shape, for example as linear preforms, and placed in a suitably shaped mold to retain the preform in the desired final shape. One non-limiting example of a mold configured to retain a preform in the desired shape is illustrated in FIG. 13. As shown, a cruciform-shaped preform 32d is placed in a cavity formed between 4 mold elements 102-108. The mold elements are configured in the desired net shape, or near net shape, of the final composite structure using conventional forming means. Under proper processing conditions in a molding apparatus, preform 32d may be processed into a composite structure having the desired shape.

Figure 14:
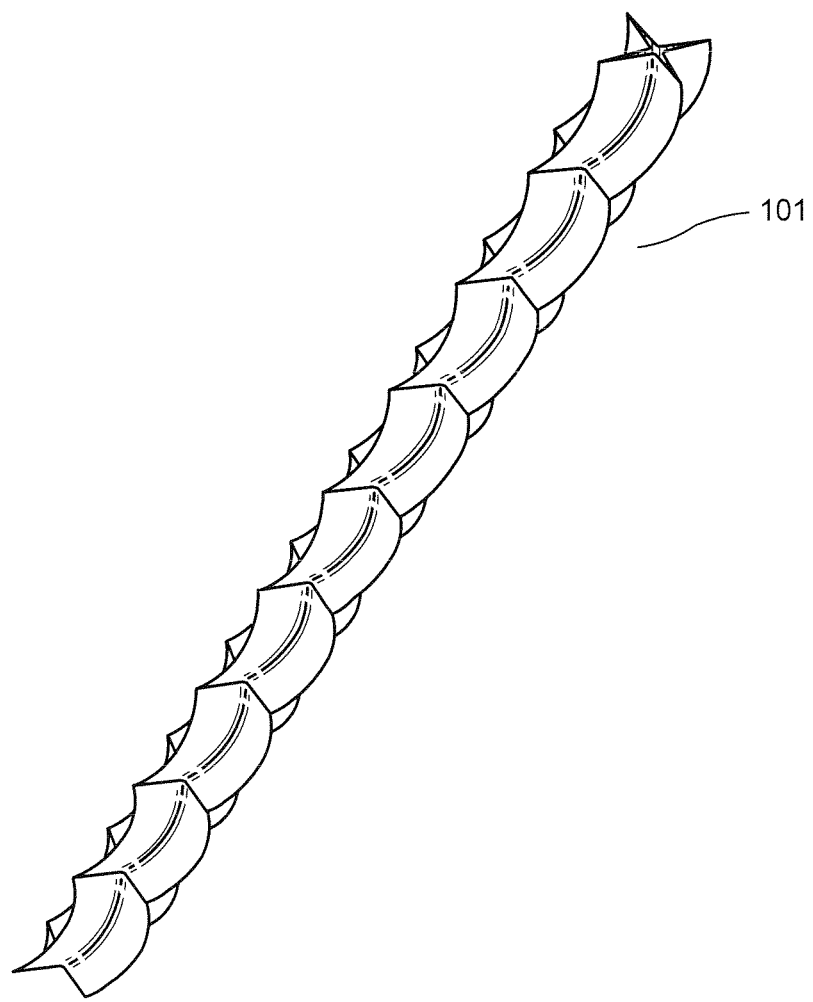
FIG. 14 is a perspective view of a composite structure produced by the mold elements and preform of FIG. 13.

FIG. 14 illustrates an example of a formed composite structure 101 produced by the mold configuration illustrated in FIG. 13 subjected to proper processing conditions.

Larger structures could be formed by placing multiple preforms and multiple sets of mold elements 102-108 adjacent to the preforms and mold elements of FIG. 13 such that at least one leg of each preform overlaps and is held in a abutting relationship with at least one leg of an adjacent preform and processed to form a composite structure.

Alternately, multiple structures 101 could be formed and assembled with overlapping elements using known techniques to form a larger structure.

Reinforced woven preform structures according to the invention may be useful in fabricating reinforced nodes between intersecting elements. In a further embodiment according to the invention, reinforced woven preform 90, similar to that illustrated in FIG. 7, may be assembled with secondary elements 92, 94, 96, and 98 to form a preform structure 64 as shown in FIG. 15. As illustrated, first ends of secondary elements 92-98 may be inserted at least partially into the space between substantially parallel leg pairs (51, 52), (53, 54), (55, 56), (57, 58), in which opposite facing leg surfaces in a pair (for example 51b and 52b in FIG. 7) are spaced apart a distance, d. The space, d, may be configured to closely engage the element inserted therein. In some embodiments, the space, d, may provide some clearance between the element and the opposite facing leg surfaces to accept, for example, an adhesive.

Woven preform 90 can be used to form a reinforced node at the intersection of elements in a stiffened panel or skin. As illustrated in FIG. 2, intersecting elements 10 and 12 form a node 14 at the line of intersection. Woven preform 90 may be placed at the node 14 with leg pairs (51, 52) and (55, 56) accepting end portions of interrupted element 12 and leg pairs (53, 54) and (57, 58) accepting end portions of interrupted element 10.

Woven preform structure 64 may be converted to a reinforced composite structure using methods discussed above.

The woven preform structure 64 is illustrated in FIG. 15 as a single node joining 4 elements for ease of illustration only. Elements 92-98 are identified as secondary elements to distinguish them from other elements in the preform. It would be obvious to one of ordinary skill in the art that the preform structure 64 may be repeated using additional woven preforms 90 at second ends of secondary elements 92-98, along with additional elements (not shown) to form a grid like structure comprising substantially rectangular cells 11, similar to that illustrated in FIG. 10.

One of ordinary skill in the art would recognize that grid-like structures comprising cells of other shapes may be achieved from differently configured woven preforms. For example, a woven preform 40 in FIG. 6 employed in a similar fashion as described above to join elements, could produce a woven preform structure comprising substantially hexagonal cells similar to cell 13 in FIG. 9.

Alternately, "hybrid" woven preforms may be formed with at least some elements arranged in pairs and others arranged singularly. As a non-limiting example, one embodiment according to the invention is illustrated in FIG. 16. Woven preform 110 has four consecutive elements arranged as two pairs of elements (111,112), (113,114), and two elements (115 and 116) arranged singularly. For ease of illustration, the node 119 is shown as a darkened circle and the 6 elements 111-116 are show as lines, representing the configurations of elements as discussed above, that is, elements having parallel or non-parallel major surfaces.

FIG. 17 represents one non-limiting example of a composite structure comprised of the hybrid preforms 110 of FIG. 16. As illustrated, a composite structure 120 is comprised of 4 hybrid preforms, assembled such that each singular element 115 and 116 is accepted within the void formed between pairs of elements (111,112) and (113,114). This pattern can be continued to form structures larger than the 3×3 grid illustrated. Hybrid preforms having other arrangements of singular elements and pairs of elements is anticipated, as are hybrid preforms with elements arranged in groups of more than 2. For example, some hybrid preforms may comprise groupings of elements in twos, threes, or more, with or without singular elements. In addition to the generally cruciform configuration shown in FIG. 16, hybrid preforms may be fabricated in other configurations such as the triad configuration of FIGS. 4 and 6, with or without singular elements.

In non-limiting, exemplary embodiments of the inventive method, grid-like structures and reinforced panels or skins with reinforced nodes can be fabricated in a more economical process than previously known. The method is suitable for use with straight and shaped preforms, that is, with preforms as discussed in the embodiments above in which the length in the longitudinal direction may be linear or curvilinear. The process may include a mold or form, generally, tooling shaped and configured to correspond with the desired shape of the finished product.

Preforms according to the non-limiting exemplary methods of producing a grid-like structure or reinforced panel are, in general, fabricated as follows. The method presented is for a cruciform shaped preform, recognizing that other shapes having fewer or more elements may be used in a similar method. A cruciform grid-like structure may be represented by the exemplary reinforced woven preform structure 62 of FIG. 10. A preform structure fabricated with preforms having three elements may be represented by the exemplary reinforced woven preform structure 60 of FIG. 9.

As an exemplary first step, a cruciform preform (30 or 80) is woven from fibers that have a coating or comprise a component capable of being heat set. Alternately, the preform may be coated or processed at a post-weaving step with a suitable coating. Non-limiting examples of appropriate coatings suitable for heat setting include sizing or tackifiers. In the alternative, preforms may pre-impregnated with a matrix or resin material after weaving.

Tooling comprising a mold cavity or cavities with shapes, contours and dimensions corresponding to the desired final shape is fabricated. The mold will typically comprise a repeated pattern of shapes corresponding to the desired size and shape of the grid-like structure. The preforms may be received within the mold in such a way that at least some legs of adjacent preforms abut each other and overlap at least some amount. FIG. 10 illustrates cruciform preforms arranged such that the legs of adjacent preforms overlap essentially completely. Other embodiments may provide different degrees of overlap depending on requirements. The mold is capable of opening to allow insertion of the appropriate preforms, and closing to seal the preforms within cavities as known in the art.

Preforms may be pre-cut to the correct length and placed in the mold, or oversized preforms may be placed in the mold and trimmed to size in the mold. After each mold cavity has received a preform insert and any other materials to be included in the composite grid-like structure, the mold is closed, sealing the cavities in which the preforms are located for processing into a composite structure.

The mold elements, inserted preforms, and any additional materials placed in the mold may be pre-heated in the mold prior to further processing. Under appropriate conditions, a resin or matrix material is injected under suitable pressure and temperature to fill the mold and to form the grid-like structure. After proper processing, the grid-like structure may be removed from the mold for post mold processing as necessary or desired.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:
1. A composite structure comprising:
a plurality of preforms, each preform comprising a plurality of commonly woven fabric elements edgewise joined and radially extending from a common node, at least one reinforcing fiber from each of the plurality of elements woven through the node and into at least one other of the plurality of elements wherein each of the plurality of preforms includes a longitudinal axis, the axes of the plurality of preforms aligned generally parallel in a grid-like pattern; and a first end of a first woven fabric element of a first of the plurality of preforms overlaps and abuts at least a second woven fabric element of a second of the plurality of preforms.

* * * * *